United States Patent
Suciu et al.

(10) Patent No.: US 9,771,863 B2
(45) Date of Patent: Sep. 26, 2017

(54) GAS TURBINE ENGINE WITH EMBEDDED DISTRIBUTED FANS

(71) Applicant: United Technologies Corporation, Hartford, CT (US)

(72) Inventors: Gabriel L. Suciu, Glastonbury, CT (US); Alan H. Epstein, Lexington, MA (US); Wesley K. Lord, South Glastonbury, CT (US); Jesse M. Chandler, South Windsor, CT (US); Stephen G. Pixton, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 481 days.

(21) Appl. No.: 14/600,304

(22) Filed: Jan. 20, 2015

(65) Prior Publication Data

US 2015/0361879 A1  Dec. 17, 2015

Related U.S. Application Data

(60) Provisional application No. 61/989,607, filed on May 7, 2014, provisional application No. 61/938,907, filed on Feb. 12, 2014, provisional application No. 61/937,153, filed on Feb. 7, 2014.

(51) Int. Cl.
| | | |
|---|---|---|
| *B64D 27/12* | (2006.01) | |
| *F02C 3/10* | (2006.01) | |
| *F02K 1/54* | (2006.01) | |
| *F02C 6/20* | (2006.01) | |
| *F02C 7/36* | (2006.01) | |
| *B64D 35/04* | (2006.01) | |

(52) U.S. Cl.
CPC ............... *F02C 3/10* (2013.01); *B64D 27/12* (2013.01); *B64D 35/04* (2013.01); *F02C 6/206* (2013.01); *F02C 7/36* (2013.01); *F02K 1/54* (2013.01)

(58) Field of Classification Search
CPC ......... B64D 33/02; B64D 33/04; B64D 27/12
See application file for complete search history.

(56) References Cited

U.S. PATENT DOCUMENTS

| | | | |
|---|---|---|---|
| 3,054,577 A * | 9/1962 | Wolf | ................. B64D 27/12 244/110 B |
| 5,161,369 A | 11/1992 | Williams | |
| 6,792,745 B2 | 9/2004 | Wojciechowski | |
| 6,966,175 B2 * | 11/2005 | Lair | ................. F01D 17/105 239/265.25 |
| 7,752,834 B2 | 7/2010 | Addis | |
| 8,015,796 B2 | 9/2011 | Babu et al. | |

(Continued)

*Primary Examiner* — Justin Benedik
(74) *Attorney, Agent, or Firm* — Carlson, Gaskey & Olds, PC

(57) ABSTRACT

An aircraft body comprises a support structure. A gas turbine engine comprises a gas generator having at least one compressor rotor, at least one gas generator turbine rotor, and a combustion section. A fan drive turbine is positioned downstream of at least one gas generator turbine rotor, and is configured to drive a shaft. The shaft engages gears to drive a plurality of fan rotors. The gas turbine engine is embedded into the support structure such that there is an inlet leading through the support structure to the fan rotors to deliver air to the fan rotors. A gas turbine engine is also disclosed.

5 Claims, 5 Drawing Sheets

(56) References Cited

U.S. PATENT DOCUMENTS

| | | | |
|---|---|---|---|
| 8,087,618 B1* | 1/2012 | Shmilovich | B64C 9/38 |
| | | | 244/198 |
| 2008/0098719 A1* | 5/2008 | Addis | B64D 27/10 |
| | | | 60/226.1 |
| 2009/0229243 A1 | 9/2009 | Guemmer | |

* cited by examiner

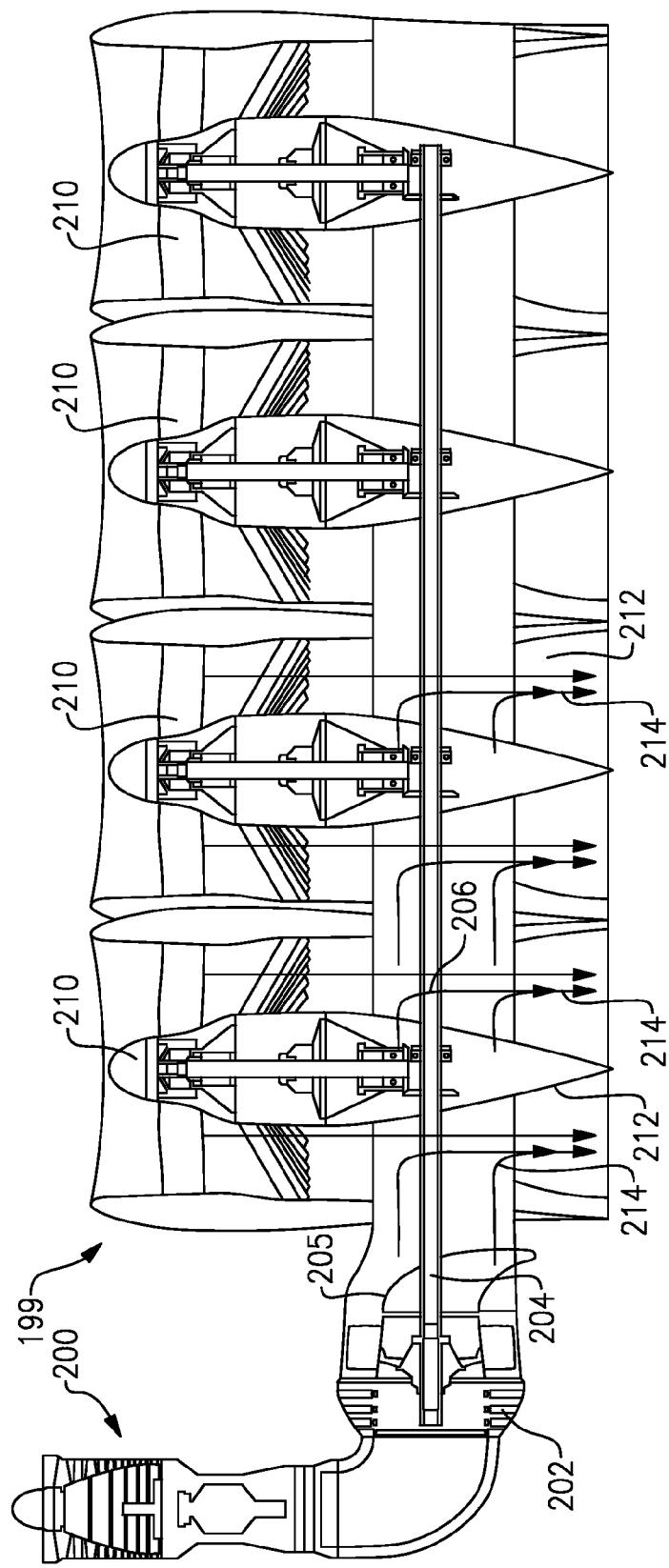

GAS TURBINE ENGINE WITH EMBEDDED DISTRIBUTED FANS

CROSS REFERENCE TO RELATED APPLICATION

This application claims priority to U.S. Provisional Patent Application Nos. 61/989,607, filed on May 7, 2014; 61/938,907 filed on Feb. 12, 2014; and 61/937,153, filed on Feb. 7, 2014.

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter fan rotor with a plurality of fan rotors. However, the proposals for driving the plurality of fan rotors have deficiencies.

SUMMARY OF THE INVENTION

In a featured embodiment, an aircraft body comprises a support structure. A gas turbine engine comprises a gas generator having at least one compressor rotor, at least one gas generator turbine rotor, and a combustion section. A fan drive turbine is positioned downstream of at least one gas generator turbine rotor, and is configured to drive a shaft. The shaft engages gears to drive a plurality of fan rotors. The gas turbine engine is embedded into the support structure such that there is an inlet leading through the support structure to the fan rotors to deliver air to the fan rotors.

In another embodiment according to the previous embodiment, the body is a wing of the aircraft.

In another embodiment according to any of the previous embodiments, a flap is associated with an exhaust downstream of each of the fan rotors. The flap is movable.

In another embodiment according to any of the previous embodiments, the flap can be moved in one direction to increase an area of the exhaust to provide a higher propulsion power, and can be moved to a location where it decreases the area to reduce the propulsion power.

In another embodiment according to any of the previous embodiments, the flap can be pivoted to block an exhaust of the plurality of fan rotors to provide a thrust reverser effect.

In another embodiment according to any of the previous embodiments, a second flap is positioned outwardly on the wing and is configured to pivot to a location to block airflow to provide additional thrust reverse effect.

In another embodiment according to any of the previous embodiments, the flap can be pivoted to block an exhaust of the plurality of fan rotors to provide a thrust reverser effect.

In another embodiment according to any of the previous embodiments, a second flap is positioned outwardly on the wing and is configured to pivot to a location to block airflow to provide additional thrust reverse effect.

In another embodiment according to any of the previous embodiments, an exhaust for the product of combustion downstream of the fan drive turbine is configured to mix with exhaust from the fan rotors.

In another embodiment according to any of the previous embodiments, there are at least four of the plurality of fan rotors.

In another embodiment according to any of the previous embodiments, a flap is associated with an exhaust downstream of each of the fan rotors. The flap is movable.

In another embodiment according to any of the previous embodiments, the flap can be moved in one direction to increase an area of the exhaust to provide a higher propulsion power, and can be moved to a location where it decreases the area to reduce the propulsion power.

In another embodiment according to any of the previous embodiments, the flap can be pivoted to block an exhaust of the plurality of fan rotors to provide a thrust reverser effect.

In another embodiment according to any of the previous embodiments, a second flap is positioned outwardly on the wing and is configured to pivot to a location to block airflow to provide additional thrust reverse effect.

In another embodiment according to any of the previous embodiments, the flap can be pivoted to block an exhaust of the plurality of fan rotors to provide a thrust reverser effect.

In another embodiment according to any of the previous embodiments, a second flap is positioned outwardly on the wing and is configured to pivot to a location to block airflow to provide additional thrust reverse effect.

In another featured embodiment, a gas turbine engine comprises a gas generator, at least one compressor rotor, at least one gas generator turbine rotor, and a combustion section. A fan drive turbine positioned downstream of at least one gas generator turbine rotor is configured to drive a shaft. The shaft engages gears to drive a plurality of fan rotors. A bypass exhaust duct is downstream of the plurality of fan rotors. There is a turbine exhaust duct for the product of combustion downstream of the fan drive turbine, which is configured to direct combustion exhaust into the bypass exhaust duct.

In another embodiment according to the previous embodiment, there are at least four of the plurality of fan rotors.

In another featured embodiment, an aircraft body comprises a support structure and a gas turbine engine, with a gas generator having at least one compressor rotor, at least one gas generator turbine rotor and a combustion section. A fan drive turbine is positioned downstream of at least one gas generator turbine rotor. The fan drive turbine is configured to drive a shaft, The shaft engages ng gears to drive a plurality of fan rotors. The gas turbine engine is embedded into the support structure such that there is an inlet leading through the support structure to the fan rotors to deliver air to the fan rotors. A bypass exhaust duct is downstream of the plurality of fan rotors. An exhaust duct for product of combustion is downstream of the fan drive turbine. The turbine exhaust duct is configured to direct combustion exhaust into the bypass exhaust duct.

In another embodiment according to the previous embodiment, a flap is associated with an exhaust downstream of each of the fan rotors. The flap is movable.

These and other features may be best understood from the following drawings and specification.

BRIEF DESCRIPTION OF THE DRAWINGS

FIG. 7 shows yet another feature.

DETAILED DESCRIPTION

Figure 1:
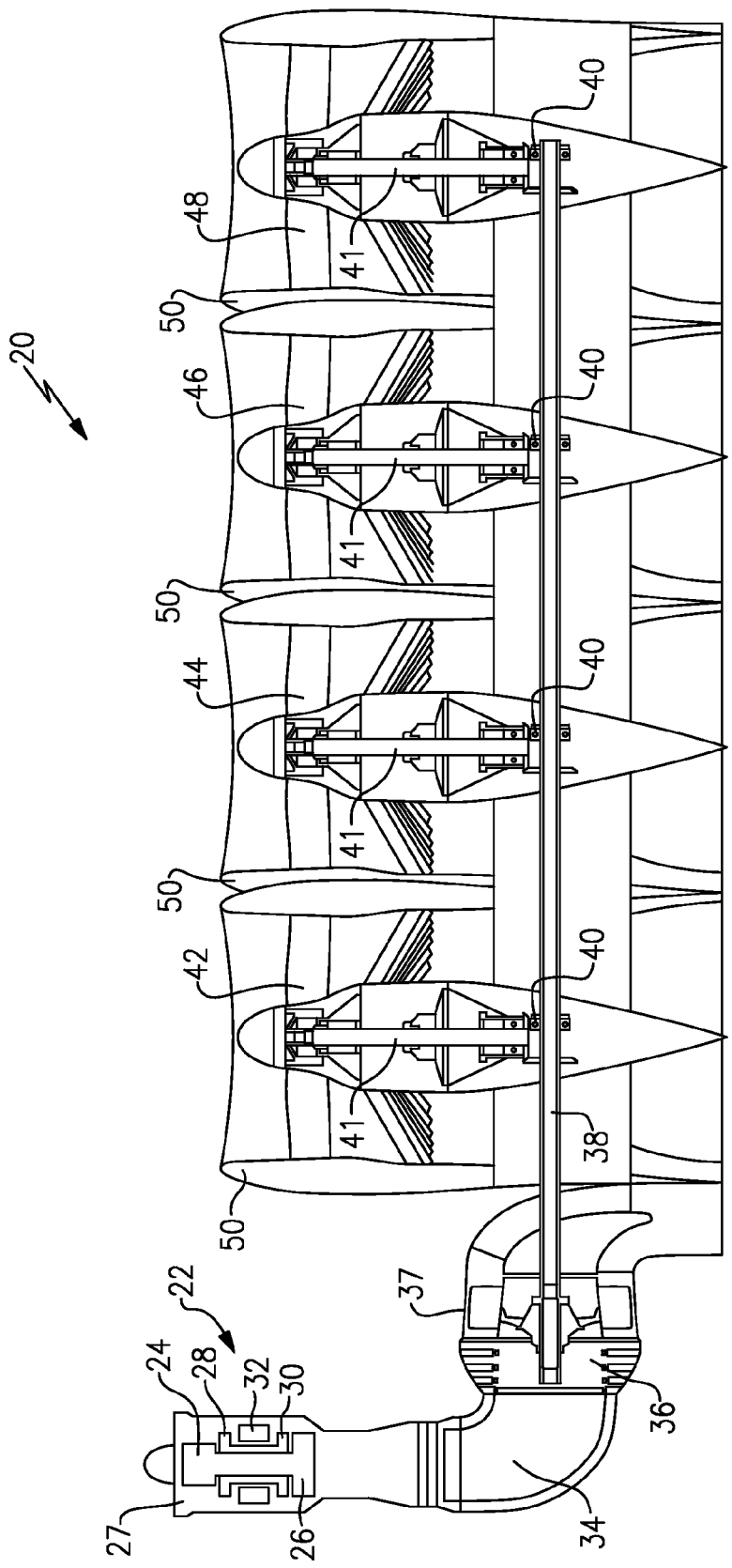
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing a single shaft 38, which drives at least four fan rotors and by utilizing a fan drive turbine 36 which is positioned downstream of the last turbine rotor 26 in a gas generator 22, this disclosure provides compact packaging, while still providing adequate drive for the fan rotors 42, 44, 46 and 48.

Figure 2:
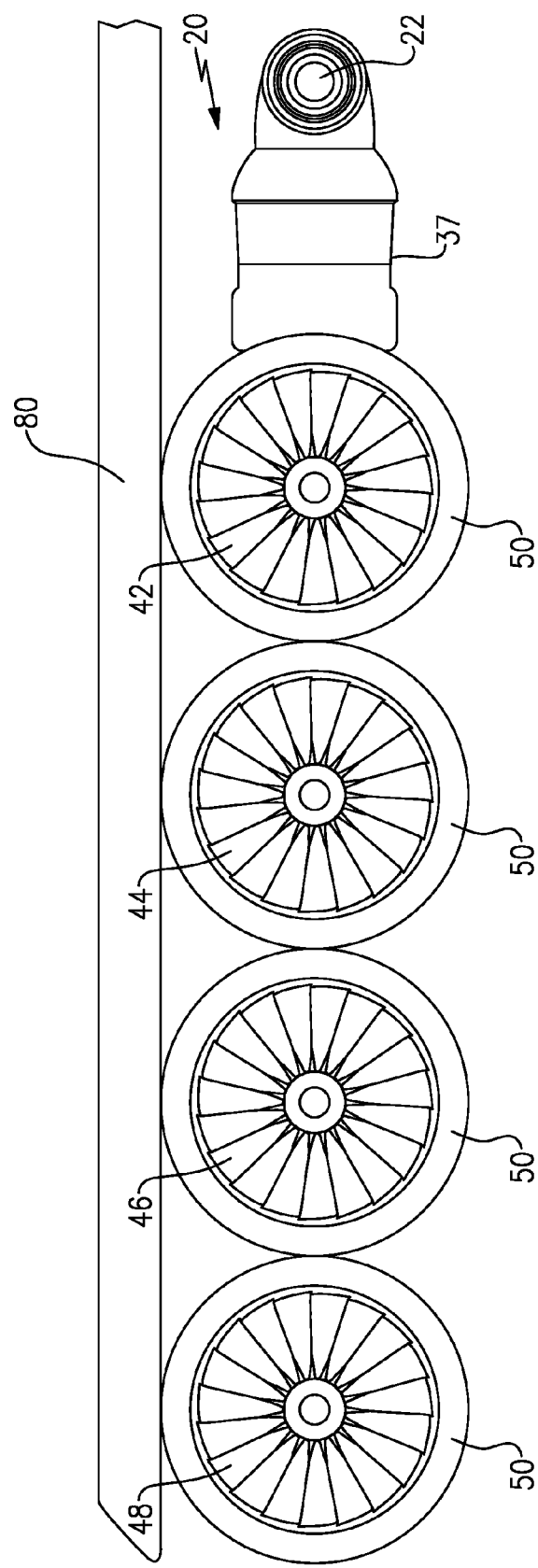
FIG. 2 is a front view of the FIG. 1 engine.

FIG. 2 is a front view of an aircraft support structure in the form of a wing 80, which may mount an engine such as engine 20. As shown, the gas generator is associated with the housing 37. The fan rotors 42, 44, 46 and 48 have diameters that are not unduly large, such that they fit within the packaging window of associated wing 80.

Figure 3:
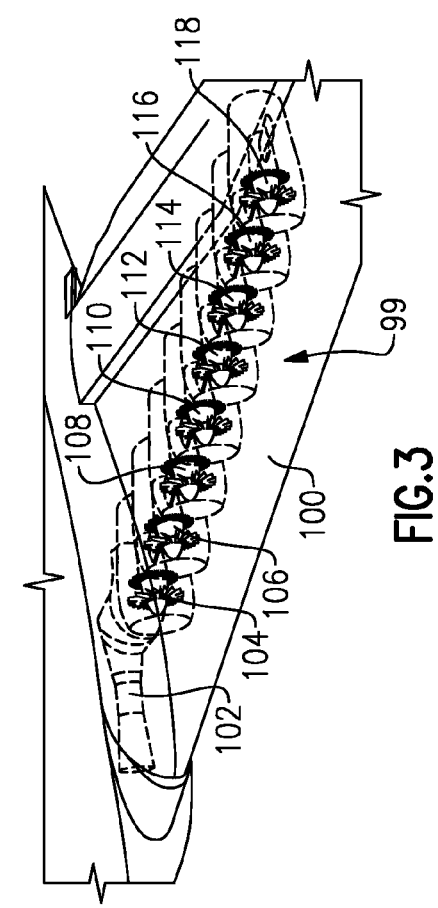
FIG. 3 shows a beneficial feature in a first embodiment.

An engine such as disclosed above provides beneficial aspects, particularly when utilized in an advanced aircraft wing 100 such as illustrated at 99 in FIG. 3. The aircraft wing 100 is relatively thin, and the engine 99 allows the provision of a plurality of fan rotors into the wing 100. Thus, as shown, as shown, a gas generator 102 drives fan rotors 104, 106, 108, 110, 112, 114, 116, and 118. The fan rotors can all have a relatively small diameter as disclosed above.

Figure 4:
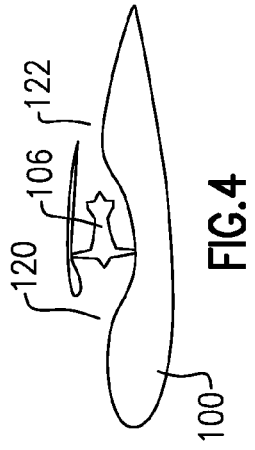
FIG. 4 is a cross-section through FIG. 3.

As shown in FIG. 4, this facilitates the inclusion of the fan rotors (only 106 shown) to be embedded in the wing 100. The inlet 120 leads to the fan rotor 106, and exhaust 122 provides exhaust propulsion for an aircraft associated with the wing 100. While the engine is shown embedded in the wing, it may be embedded in other support structures such as the aircraft fuselage or an aircraft tail under certain applications.

The basic engine as described above is disclosed in co-pending U.S. patent application Ser. No. 14/597,510, entitled "Gas Turbine Engine With Distributed Fans" and filed on even date herewith. This basic fan structure can be incorporated into a gas turbine engine arrangement having one or more gas generators, and paired sets of the distributed fan.

Figure 5:
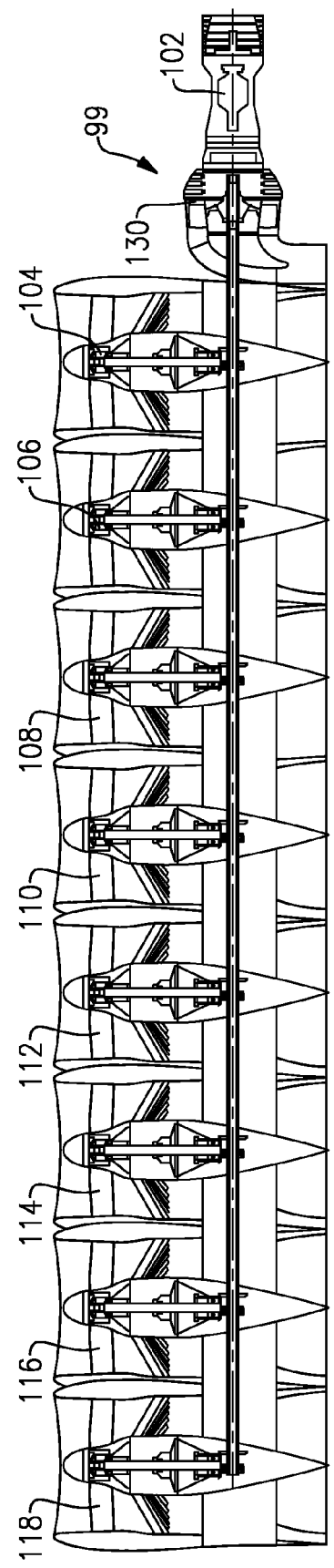
FIG. 5 is another view.

FIG. 5 shows another view of the engine 99 with the gas generator 102 driving the fan drive turbine 130 to drive the fans 104, 106, 108, 110, 112, 114, 116, and 118.

Figure 6A:
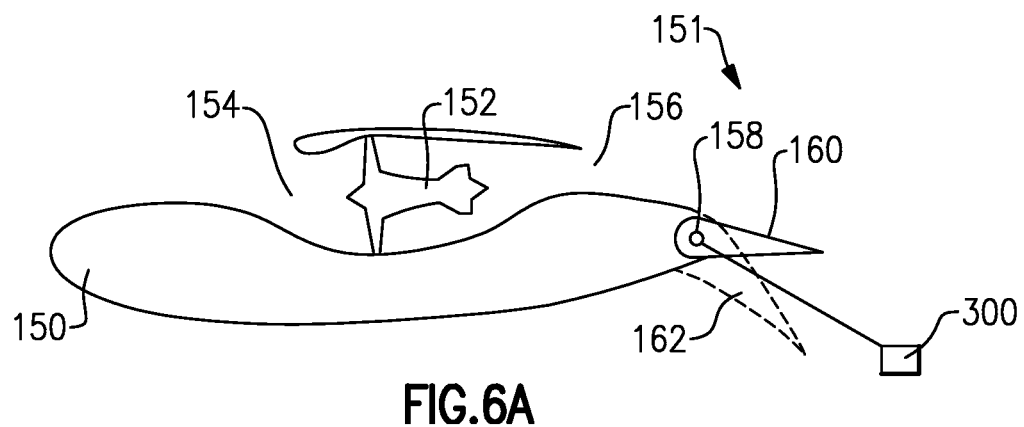
FIG. 6A shows another embodiment.

FIG. 6A shows an embodiment wherein the wing 150 is provided with a pivot point 158 for a flap 160 associated with a downstream end 151 of the exhaust 156. Again, an inlet 154 leads to an embedded fan rotor 152, which may be similar to that shown in FIG. 3 or 5. An actuator 300 induces a control to move the flap 160.

In FIG. 6A, the flap is shown (in solid lines) in a cruise position wherein it limits somewhat the flow of air through the exhaust 156. This limits the amount of propulsion provided by the fan rotor 152. The flap 160 can be pivoted to the position shown at 162 in dash line for higher power mode, such as take-off of the aircraft associated with the wing 150.

Figure 6B:
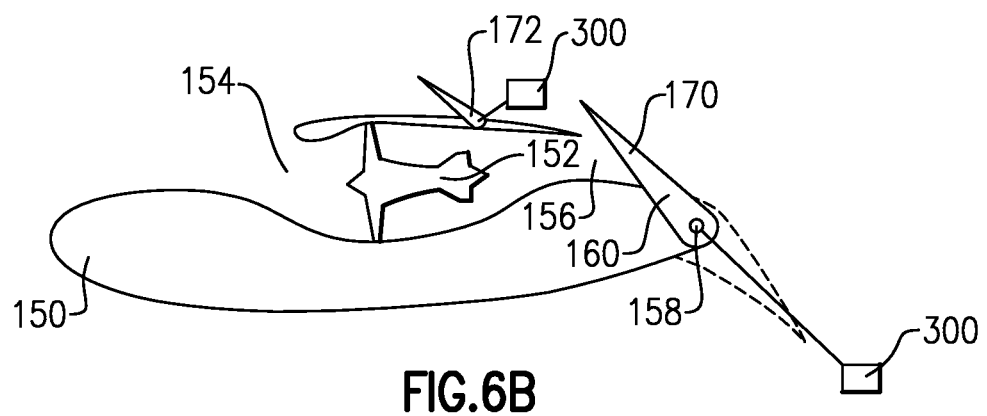
FIG. 6B shows yet another embodiment.

On the other hand, FIG. 6B shows a thrust reverser position, wherein the flap 160 is pivoted to position 170 to block the exhaust 156, and slow the aircraft. A second flap 172 is also shown. The flaps 172 and 160 are shown being driven by an actuator 300, shown schematically. Thus, when the associated aircraft is in a high power mode, the flap may be moved to the position shown at 162. During cruise, the flap may remain in the position shown in FIG. 6A. Upon landing, the thrust reverser mode as shown in FIG. 6B may be adopted. Flaps 160 and 172 thus provide a thrust reverser effect.

FIG. 7 shows another feature of an engine 199. The engine 199 has a gas generator 200 driving a fan drive turbine 202, which drives a shaft 204 to drive a plurality of fan rotors 210, as in the above embodiments. However, in the above embodiments, products of combustion downstream of the fan drive turbine 202 exit on their own exhaust. In this embodiment, an exhaust duct 205 of the fan drive turbine 202 mixes hot products of combustion 214 with the cooler air 206 exiting the exit nozzle 212 of the fan rotors 210.

This feature will "hide" the heat signature of the aircraft associated with the engine 199. This can become important, to make the aircraft less likely to be identified by various surveillance equipment.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:
1. An aircraft body comprising:
a support structure; and
a gas turbine engine comprising:
a gas generator having at least one compressor rotor;
at least one gas generator turbine rotor;
a combustion section;
a fan drive turbine positioned downstream of said at least one gas generator turbine rotor, said fan drive turbine configured to drive a shaft and said shaft engaging gears to drive a plurality of fan rotors; and
said gas turbine engine being embedded into said support structure such that there is an inlet leading through said support structure to said fan rotors to deliver air to said fan rotors;
said body is a wing of said aircraft;
a flap is associated with an exhaust downstream of each of said fan rotors, and said flap being movable; and
said flap is moved in one direction to increase an area of said exhaust to provide a higher propulsion power at take-off, and is moved to a location where it decreases said exhaust area to reduce the propulsion power at cruise.
2. The body as set forth in claim 1, wherein said flap can be pivoted to block an exhaust of said plurality of fan rotors to provide a thrust reverser effect.

3. The body as set forth in claim 2, wherein a second flap is positioned outwardly on said wing and is configured to pivot to a location to block airflow to provide additional thrust reverse effect.

4. The body as set forth in claim 1, wherein an exhaust for the product of combustion downstream of said fan drive turbine is configured to mix with exhaust from said fan rotors.

5. The body as set forth in claim 1, wherein there are at least four of said plurality of fan rotors.

* * * * *